Figure 1:
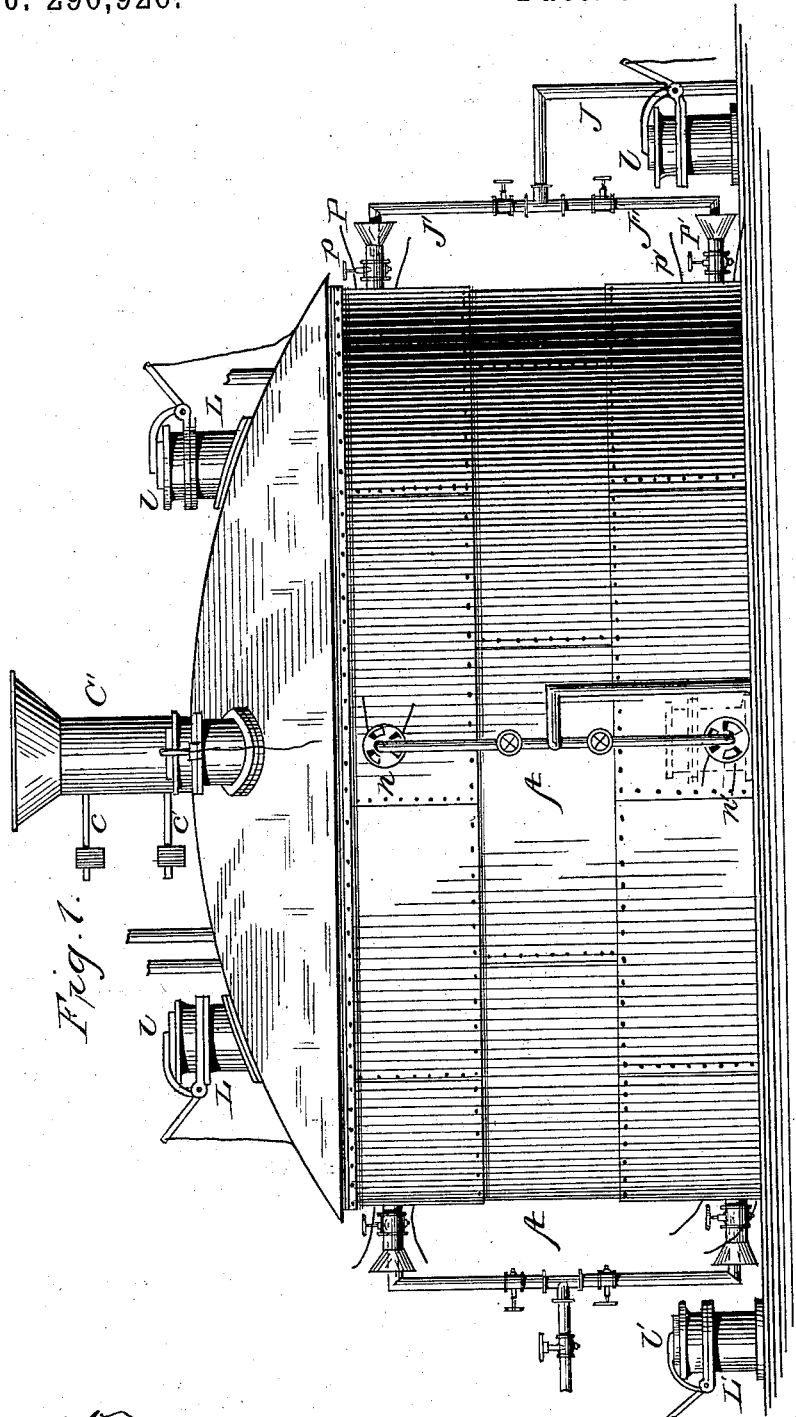

(No Model.)  4 Sheets—Sheet 2.

H. C. REW.
PROCESS OF AND APPARATUS FOR MANUFACTURING GAS.

No. 290,926.  Patented Dec. 25, 1883.

(No Model.) 4 Sheets—Sheet 3.

H. C. REW.
PROCESS OF AND APPARATUS FOR MANUFACTURING GAS.
No. 290,926. Patented Dec. 25, 1883.

(No Model.) 4 Sheets—Sheet 4.

H. C. REW.
PROCESS OF AND APPARATUS FOR MANUFACTURING GAS.

No. 290,926. Patented Dec. 25, 1883.

UNITED STATES PATENT OFFICE.

HENRY C. REW, OF CHICAGO, ILLINOIS.

PROCESS OF AND APPARATUS FOR MANUFACTURING GAS.

SPECIFICATION forming part of Letters Patent No. 290,926, dated December 25, 1883.

Application filed May 2, 1883. (No model.)

*To all whom it may concern:*

Be it known that I, HENRY C. REW, of Chicago, in the county of Cook and State of Illinois, have invented certain new and useful Improvements in Processes of and Apparatus for Manufacturing Gas; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to the manufacture of illuminating and heating gas from steam, carbonaceous fuel, and hydrocarbon oil in a continuous manner; and the invention consists in the particular process and the apparatus hereinafter defined in the claims.

Heretofore in the manufacture of gas by the cupola process, where regenerators have been used as heat-storing chambers, and for subsequently heating air or superheating steam and fixing enriched or carbureted gases, these regenerating-chambers have been connected by flues conducting products of combustion directly with the fuel and generating chambers, (either in the same or an adjoining structure,) and such regenerators have been heated by products of combustion from the fuel-chambers, in which the fires were urged by strong blasts of air. The effect of this has been to drive the fine dust and ashes of the fuel into the regenerators, and to clog up the passages in the refractory material to an injurious extent, thereby retarding their operation and hindering the manufacture of gas. To obviate this defect entirely is one of the objects of my invention. Furthermore, in blasting up the fires by a strong blast of air, the effect has been to more highly heat that portion of the fuel which was in close proximity to the air-blast and to cause the ash to be fused into clinkers, which clogged the fires. Portions of clinker have also obstructed the fuel-chamber by firmly adhering to the walls thereof, and have been so difficult of removal that the fires have had to be drawn out entirely at times to remove this débris from the fuel-chamber, thus stopping for the time required for that operation the manufacture of gas. By one process the ash has been removed in the form of fluid slag. This has proved quite objectionable, for the reason that in drawing the slag the large amount of heat contained in it has been allowed to go to waste, and the manufacture of gas has also had to be discontinued while the slag was being drawn. Another serious objection has been that a large amount of fluxing material has had to be added to the fuel, and considerable of the heat and force of the fires has been required to fuse this superfluous non-gas-producing material so that it would flow out as a molten slag. To overcome all these objections, and to so handle the ash that it can be removed without waste of heat or without discontinuing the manufacture of gas, and without adhesion of clinkers to the walls of the fuel-chamber, are objects of this invention.

Previous cupola processes have demonstrated that the operation of heating a large body of fuel by blasts of air is a very defective one, for the reason that the air forced into the fuel changes its form after passing a very small distance into the fuel, and combines with the carbon of the coal, forming carbonic oxide and nitrogen, gases which are non-supporters of combustion, and therefore unfit to accomplish the object of bringing the fuel to a white heat beyond that small limit. By my process of highly and uniformly heating a body of fuel by the use of highly-superheated steam under pressure, the above defect is entirely overcome. The oxygen of the steam combines with the carbon of the coal, forming carbonic oxide and setting hydrogen free, the two passing off together to the fixing-chamber, thus making way instantly for fresh steam from the superheating-chamber, which, reacting upon the fuel, causes a mutual and continuous decomposition of the two substances, giving rising to the continuous production of carbonic oxide and hydrogen without contamination with inert and deleterious nitrogen. When bituminous coal is used, the hydrocarbons are volatilized and the solid carbon is taken up by the oxygen of the steam in a continuous manner. Moreover, in the manufacture of gas heretofore by the cupola process, the operation has not been a continuous one. Complete cessation of the manufacture and frequent delays have been occasioned by stopping to add fresh fuel and to blast up the fires, and to remove ash, clinkers, cinders, and slag. To remove these objections and to make the manufacture of gas continuous are objects of my invention. Moreover, heretofore by previous processes the heat-storing chambers have been heated by the combustion of raw solid fuel, and not by properly-prepared gaseous fuel, and not in a quick or economical manner. To heat the various chambers containing refractory material in the quickest and most economical manner is one of the objects of my invention. Moreover, by previous cupola processes the value of liquid hydrocarbons as gas-producing materials has not been sufficiently taken into account, and none of the apparatus have been constructed to use it without other carbonaceous fuel. My invention is designed to utilize any kind of gas-producing materials, solid or liquid, (or mixed,) so that whatever material is within reach and most economical can be used. Furthermore, previous cupola processes have required a holder for the storage of gas, or else a series of cupolas to keep up a continuous supply of gas. The holders have been expensive to construct and maintain, very dangerous in case of accidents and explosions, and have greatly depreciated the value of surrounding property. By my invention I dispense with the use of holders and supply the mains from a single generator, thus curing the defects before mentioned and greatly cheapening the cost of gas. By dispensing with holders I am enabled to construct my apparatus entirely under cover in suitable buildings and not exposed to the action of the elements.

Heretofore, also, by previous cupola processes powerful engines and blowers have been employed to blast up the fires to the proper condition for the manufacture of gas. These have been costly to construct and maintain and expensive to run. By my invention I dispense entirely with this machinery for blasting the fires, and thus save greatly in outlay and expense, and am enabled to economize still further in the manufacture of gas. By previous cupola processes the fires, after having been subjected to the blast of air to bring the fuel to an incandescent condition, have been left full of nitrogen, (a non-combustible gas,) which it has been found necessary to expel before commencing the operation of manufacturing gas by the decomposition of steam. To accomplish this, steam has been admitted to the fuel-chamber, which has driven the nitrogen into the open air, leaving the hydrogen derived from the steam in its place. The expulsion of the nitrogen, however, has carried out a large amount of heat which has gone to waste in the open air. By my process this defect does not exist, and thus greater economy is secured and no loss of time and heat occur in the manufacture of gas.

All the foregoing objects and advantages are secured by my invention, as will be hereinafter more fully described.

In conducting my process, the fuel in the generating and decomposing chamber is first raised to incandescence by natural draft, and at the same time two heat-storing chambers containing refractory material are independently heated to the proper temperature by the combustion within them of jets of purified water-gas, or other gas free from ash and dust and air, that one to be used for superheating steam being much more highly heated. The decomposing and generating chamber, the steam-superheating chamber, and the gas-fixing chamber all being properly heated, the air and gas are shut off. Steam is now admitted into the hottest heat-storing chamber, where it is highly superheated, and is conducted directly therefrom into the carbonaceous fuel, where decomposition and recomposition take place, resulting in the production of carbonic oxide and hydrogen, and the fuel, if it contains bituminous matter, is distilled and the carbureted hydrogen driven off. The different gaseous products are conducted into the heated fixing chamber, where they may be enriched, if desired, by liquid hydrocarbon, and where they are, whether enriched or not, combined and fixed in the form of a homogeneous gas.

At the time the operation of making gas is commenced in the first pair of heat-storing chambers, as described, the gas and air are admitted to a second pair, and they are heated for subsequent use in superheating steam and fixing gas, and as they are adjacent to the first pair and to the generator, the combustion going on in them (the second pair) longer maintains the heat of the fuel in the generator, and that of the refractory material in the first set of chambers. When the first set of chambers are reduced too low in temperature to properly superheat steam and fix the gases, the steam and gas are closed off from them and immediately admitted to the second set of chambers, which are now heated to the proper temperature. Steam is now superheated to a sufficiently high degree to undergo decomposition in contact with the carbonaceous fuel without admission of air, and the gases are fixed in the second fixing-chamber. During the operation of the second set of chambers for making gas, the first set is reheated as in the first instance. The heat of the fuel is maintained by the highly-superheated steam admitted to it, and by the combustion going on in the heat-storing chambers surrounding the decomposing and generating chamber the process is made continuous, no air is admitted to the fuel, resulting in the formation of clinker, and no dust and ashes are lodged among the refractory material of the heat-storing chambers. Fuel is supplied to the generator by a tight feeding apparatus, and the ash is removed therefrom through a double-chambered ash-pit without the admission of air and without interruption to the operation of making gas.

Having given a general statement of the object and nature of my invention, I will now describe it more particularly with reference to the accompanying drawings, in which—

Figure 2:
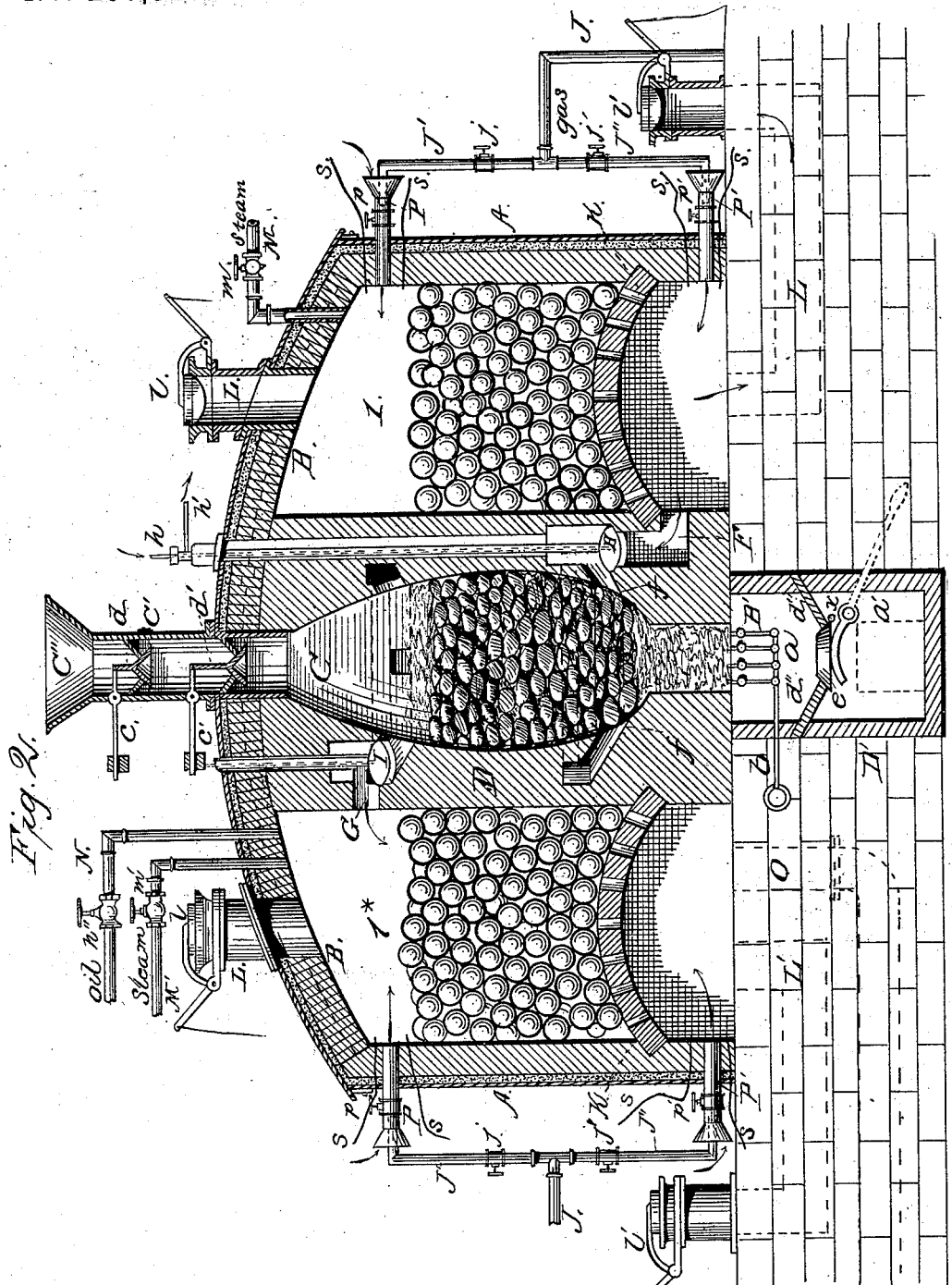
Figure 3:
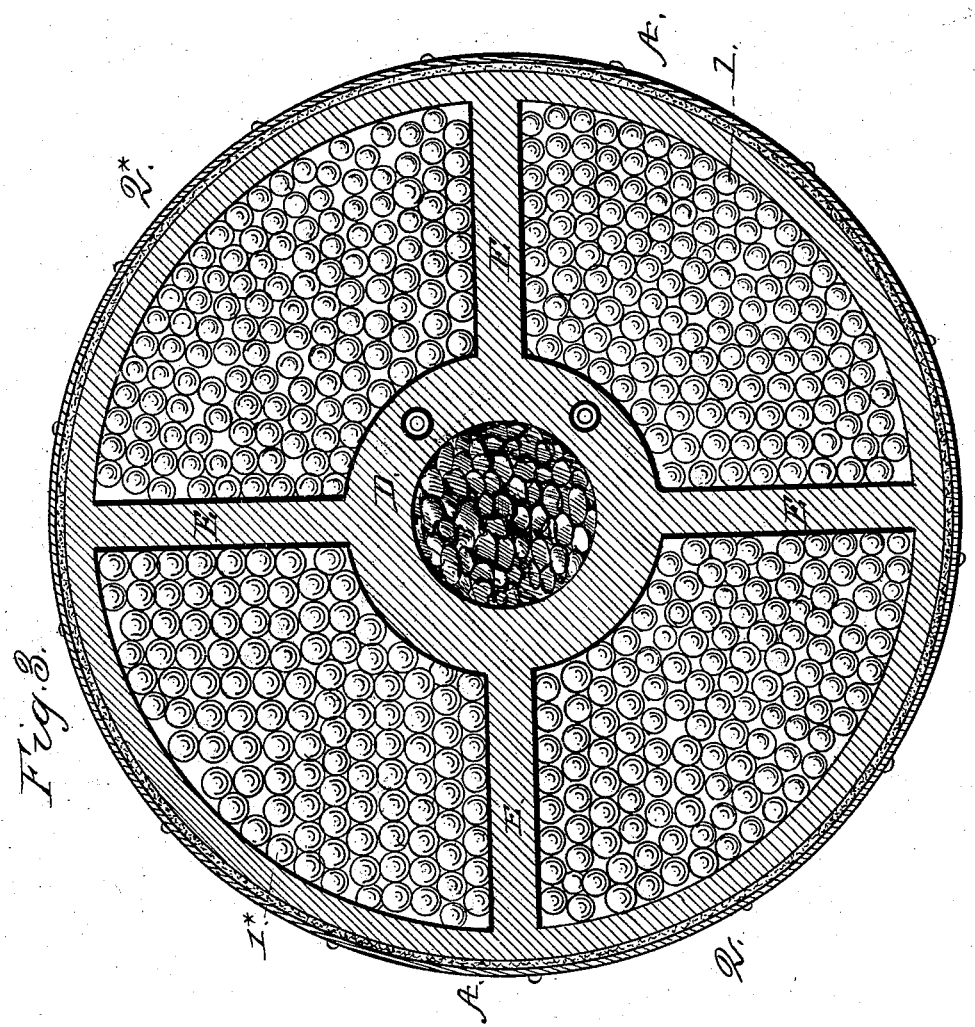
Figure 4:
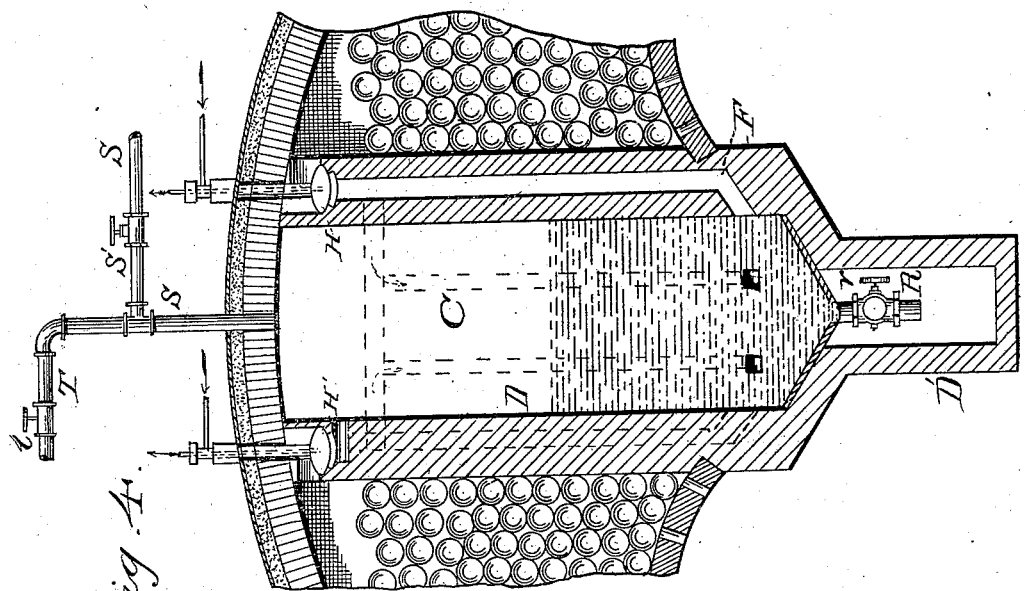

Figure 1 represents an elevation of the generator and the valved connecting pipes. Fig. 2 represents a vertical section through the heat-storing chambers and through the decomposing and generating chamber. Fig. 3 represents a horizontal section, showing the four heat-storing chambers and the central decomposing and generating chamber. Fig. 4 represents a vertical section of a generating-chamber constructed to contain liquid hydrocarbon and portions of two heat-storing chambers.

In the following description similar letters of reference designate like parts in all the figures of the drawings.

The outer wall, A, of the structure is preferably built in circular form of the best fire-brick, and this and the arched top B, also made of fire-brick, are covered with plates of boiler-iron riveted gas-tight, a non-conducting packing being placed in a space between the iron jacket and the brick wall in the usual manner. The decomposing and generating furnace or chamber C is built of substantial fire-brick walls D, centrally within the outer walls, leaving a large annular space between them. This space is divided by four vertical radial walls, E, extending from the wall D of the generator to the outer wall, A, into the four heat-storing chambers 1 1* and 2 2*. The central generating-chamber, C, is constructed internally of about the form of a blast-furnace, and is provided at the top with a charging-chamber, C', and funnel C'', extending above the arch B. The chamber C' is made tight, and is divided from the furnace and from the external air by the cup and cone valve arrangements $d$ $d'$, the cones or bells of which are operated independently by the pivoted and weighted levers $c$ $c'$.

At the base of the generator is placed the double-chambered ash-pit D' and the pivoted shaking-grate B'. The ash-pit is divided into two tight chambers, $a a'$, by the hopper-shaped partition $d''$, having a central opening, and the tight-fitting valve $e$. The valve $e$ is hinged, and is held to its seat in the partition $d''$ by a cam, $x$, operated by a handle and rock-shaft outside of the lower ash-pit. Each bar of the grate is made quite wide, and is pivoted at each end near its upper edge, and they are all loosely connected at their lower edges by a shaking-handle, $b$, extending through the side of box $a$. By this construction the grate serves not only to shake down the ashes, but to crack and break any hard lumps of cinder that may come down. In operation care is taken that a sufficient bed of ashes is retained upon the grate to protect it from corrosion by the steam admitted to the decomposing-chamber. The generator C has two or more induction-ports or tuyeres, $f$, near its base, connecting by an annular flue in the wall D and by the flues F with the bases of the two steam-superheating chambers 1 2. But one flue F is shown leading into the base of chamber 1. Each flue F is provided with a water-cooled controlling-valve, H, having the usual inlet and outlet water-pipes, $h$ $h'$. An outlet-flue, G, having a water-cooled controling-valve, I, connects the upper part of the generator with each fixing-chamber 1* 2*. The heat-storing chambers surrounding the generator—two of which, 1 and 2, are used for superheating steam, and two of which, 1* and 2*, are used for fixing gases—are constructed alike with only a slight difference in the connecting-pipes, and a description of one will suffice for them all. A perforated arch, K, near the bottom of each chamber, supports the refractory material, preferably balls or spheres of fire-clay, filling the chamber above, and each chamber is provided with two chimneys, L L'—one at the top and one at the base. The chimneys are provided with close-fitting lids or caps $l$ $l'$. A pipe, J, and the branch pipes J' J'' supply the gas for burning in the chambers, and the branches connect, respectively, with the top and bottom of each chamber, the bent end of each entering the flaring mouth of the air-inlet pipes P P'—one at the top and one at the bottom of each chamber. The flaring mouths of the air-pipes are provided with the turning-registers $n$ $n'$, (see Fig. 1,) for regulating the quantity of air admitted. The gas-pipes entering the larger air-pipes act as injectors for drawing in air to support combustion within the heat-storing chambers. The gas-pipes are provided with valves $j$ $j'$, and the air-pipes with valves $p p'$. A pipe, M, having a valve, $m$, supplies steam to the top of chamber 1, and a pipe, M', having a valve, $m'$, supplies steam to the top of chamber 1*, and a pipe, N, having a valve, $n''$, supplies oil to the top of chamber 1*, which is the fixing-chamber.

The two steam-superheating chambers 1 and 2 connect each, by a flue, F, at their bases, with the base of the decomposing and generating chamber C, and each fixing-chamber, as 1*, has a gas-eduction pipe, O, connecting with its base for conducting away the gas to be delivered to the mains. Electrical wires $s$ enter the chambers 1 1* in proximity to the openings of the gas and air inlet pipes for igniting the gas when it is admitted.

In the modification shown in Fig. 4 the construction of the apparatus is the same as that above described, with the exception of the central generating-chamber, C. In this modification the chamber C is lined with sheet metal, for containing liquid hydrocarbon, and the tight chamber thus formed is provided with an oil-inlet pipe, S, having valve S', and a steam-injecting pipe, T, having valve $t$ at the top, and at the bottom is provided with a draw-off pipe having valve $r$, for drawing off the non-gas-producing residuum, extending into chamber D'. The flue F, for admitting superheated steam to chamber C, extends from the top of the adjacent superheater, and opens beneath the oil near the bottom of chamber C. In this case the steam to be superheated should be admitted to the bottom of the superheating-chamber and passed up through the heated refractory material.

The operation of my apparatus is as follows, reference being had first to Fig. 2: A fire is first kindled in the generator C, the ash-pit door and valve and the charging-chamber C' being left open for a natural draft, and the valves H and I are closed. Fuel is charged in, and the fire is kept burning until a sufficiently large body of fuel is highly heated. At the same time the two chambers 1 and 1* are heated up, gas and air are first admitted at the top and burned, and the products of complete combustion carried out at the bottom through chimneys L', the caps l' thereof being open. After the upper parts of the refractory material have become sufficiently heated, the gas and air are turned off from the pipes J' and P, and lids l' are closed. Then lids l of the upper chimneys are opened, and the gas and air are admitted to the lower parts of the chambers by pipes J'' and P', the valves of which are opened for that purpose. The gas is ignited and combustion continued till the entire body of refractory material is properly heated. The steam-superheating chamber should be more highly heated than the fixing-chamber. The chambers being all properly heated, the valves in gas and air supply pipes are closed, the chimney-caps are closed, the ash-pit is tightly closed, and the cone-valves d d' are closed, a charge of coal preferably being in position in chamber C', and the valves H and I are opened. Steam is now admitted by pipe M and valve m into the top of superheating-chamber 1, and passed down through the refractory material, and becomes highly superheated, after which it passes by flue F and tuyeres f into the carbonaceous fuel in chamber C, where it is decomposed. The resulting gases are passed through flue G into chamber 1*, where they are carbureted by hydrocarbon oil admitted through pipe N, and the carbureted gases are converted into a fixed gas by passage down through the refractory material. If heating-gas only is required, steam may also be admitted through pipe M', and the steam mutually decomposed in contact with the heated balls, largely increasing the volume of heating-gas. During the operation of making gas in these chambers, the other pair of chambers, 2 and 2*, are heated up by the combustion of gas, as described with reference to chambers 1 and 1*.

The manufacture of gas by the use of chamber 1, for superheating steam, and chamber 1*, for fixing gas, is continued till the temperature of such chambers is reduced too low, when the steam and gas are shut off from them, respectively. Then the steam and gas are admitted to the now-heated chambers 2 and 2*. The steam is so highly superheated in chamber 2 as to maintain the heat of the fuel in the generating-chamber and be decomposed thereby.

During the manufacture of gas by the use of chambers 2 and 2*, the chambers 1 and 1* are reheated. The operation is thus continued. The coal or other fuel is periodically admitted to chamber C by first filling chamber C', by opening cone-valve d, then closing it and opening cone-valve d', and dropping the charge, thus preventing escape of gas. The ashes are shaken down by the shaking-grate and dumped into the lower chamber, a', after which the valve e is tightly closed and the ashes removed from the lower chamber through the outer door provided for that purpose, thus preventing the admission of air, and without interruption to the gas-making process. A charge of coal is always kept in the chamber C', in order that it may be preliminarily heated previous to admission to the decomposing-chamber C.

The following very superior advantages are gained by this process, viz: The gas is distilled from the fuel employed by the action of direct heat applied uniformly and constantly throughout the whole mass. The heat being distributed uniformly throughout the fuel, the ash is not fused into clinkers or cinders and does not adhere to the walls, but is left a dry powder, and descends by the gradual working down of the fuel, as it is decomposed and volatilized by the action of the highly-heated steam, until it reaches the grate-bars, where it is easily shaken out in the manner above mentioned. No time is lost in charging the decomposing-chamber with fuel and shaking out the ash; but the manufacture of gas is continuous.

Very important advantages are gained by heating the chambers filled with refractory material by the combustion of heated gas and air free from dust and ashes, for the reason that no dust is lodged among the refractory material filling the chambers, and they are kept clean and in condition to be worked up to the full capacity of the chambers at all times. Greater economy is also secured by this method of heating the chambers, as it has been demonstrated that gas can be supplied for fuel cheaper than coal. The heating of the chambers can also be accomplished in less time than is usually done by other cupola processes, as the gas used, being free from nitrogen and dust, yields a much higher temperature in combustion than that usually employed.

When liquid hydrocarbons are used in chamber C, modified in structure, as shown in Fig. 4, the process is similar to that above described. The highly-heated steam is passed up through the oil, converting it into gas and vapor, and the mixture is converted into a fixed gas in the fixing-chamber. As the gas passes from the fixing-chamber in a highly heated condition, its heat may be stored in regenerating-chambers, (not here shown,) and subsequently utilized for heating the air and gas used for burning in the superheating and fixing chambers of the generating apparatus. Four chambers are employed, two being heated up by waste gas, while gas and air are being heated by passage through the other two in the usual manner.

The fuel being heated by direct and continuous heat in the manner described, the apparatus may be made very large and capable of supplying any required demand.

Having described my improved process and apparatus, what I claim, and desire to secure by Letters Patent, is—

1. The process of generating gas which consists in heating a body of carbonaceous fuel by continuously forcing superheated steam into it, and thereby heating it to the decomposing temperature and causing decomposition of the steam into hydrogen and carbonic oxide, then conducting the gases into a fixing-chamber and enriching or carbureting them with hydrocarbon oil, and finally converting the carbureted gases into a fixed gas by passing them through heated refractory material in the fixing-chamber.

2. The process of generating gas which consists in first highly heating a steam-superheating-chamber and a gas-fixing chamber containing refractory material by burning in them purified gas, or gas free from dust and ash, then superheating steam to or above the temperature at which it is decomposed in contact with carbonaceous fuel by passage through the refractory material, then highly heating a bed of carbonaceous fuel and decomposing the steam and distilling the gases from the fuel by passing such steam through the fuel, and then fixing the gases resulting from the decomposed steam and that distilled from the coal in the heated fixing-chamber.

3. The process of generating gas which consists in first highly heating a steam-superheating chamber and a gas-fixing chamber containing refractory material by burning in them purified gas, as described, then shutting off the combustion-gas and air, and at the same time admitting gas and air to and highly heating a second set of steam-superheating and gas-fixing chambers, and during this operation superheating steam to or above its decomposing temperature by passage through one of the first heated chambers of refractory material, then highly heating a bed of fuel and decomposing the steam by passing it through the fuel, and fixing the resulting gases by passing them through the heated fixing-chamber, thus continuing the operation till the first set of chambers are reduced too low in temperature, then shutting off the steam and gas therefrom and admitting them into the second set of now highly-heated chambers, and continuing the manufacture of gas as first described, whereby the two sets of chambers are alternately heated and used for superheating steam and fixing gas and the production of gas is made continuous.

4. The generating furnace or chamber C, having inlet-flues or tuyeres near the bottom and outlet-passages near the top, and having the double cup and cone charging devices in the throat or stack, and the double ash-pit with the tight-fitting valve in its partition, in combination with the adjacent steam-superheating and gas-fixing chambers.

5. A heat-storing chamber for superheating steam or fixing gases, provided with a filling refractory material, having gas and air mixing tubes or burners passing through the outer walls, which tubes are supplied with gas-supply pipes passing into them, a steam or oil inlet pipe, and one or more chimneys, in combination with the decomposing and generating chamber and a connecting-flue, for the purpose described.

6. The generating apparatus consisting of the central decomposing and generating apparatus having the feeding devices and the ash-removing devices, as described, and the four surrounding heat-storing chambers provided with gas and air inlet pipes, the chimneys for products of combustion, the steam and oil inlet pipes, and the connecting gas-flues, for the purpose described.

7. A heat-storing chamber for superheating steam and for fixing gas, provided with a perforated arch and a filling of refractory material, and having gas and air inlet pipes entering through its outer wall, a steam or oil inlet pipe, and a chimney, in combination with the decomposing and generating chamber, and a connecting-flue and electrical wires for igniting the gas and air used in heating the chambers.

8. The generating apparatus consisting of the central decomposing and generating apparatus having the feeding devices and the ash-removing devices, as described, and the four surrounding heat-storing chambers provided with gas and air inlet pipes, the chimneys for products of combustion, the steam and oil inlet pipes, and the connecting gas-flues, for the purpose described, and electrical wires, as set forth.

9. The process of manufacturing gas which consists in heating a body of fuel partially by heat radiated through the walls of the chamber containing the fuel, thus partially volatilizing the gases contained in the fuel, and further completing the operation of distilling the gases from the fuel by admitting highly-heated steam, the gas being generated by volatilization from transmitted heat through the walls of the fuel-chambers and by mutual destructive distillation of the highly-heated fuel and superheated steam, as set forth.

In testimony that I claim the foregoing as my own I affix my signature in presence of two witnesses.

HENRY C. REW.

Witnesses:
O. E. DUFFY,
M. P. CALLAN.